US008330982B2

(12) United States Patent
Yamada

(10) Patent No.: US 8,330,982 B2
(45) Date of Patent: Dec. 11, 2012

(54) PRINT CONTROL APPARATUS AND PROGRAM

(75) Inventor: Jun Yamada, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 953 days.

(21) Appl. No.: 12/396,767

(22) Filed: Mar. 3, 2009

(65) Prior Publication Data
US 2009/0237737 A1    Sep. 24, 2009

(30) Foreign Application Priority Data

Mar. 24, 2008  (JP) ................................ 2008-075164
Jan. 29, 2009   (JP) ................................ 2009-017698

(51) Int. Cl.
*G06F 15/00* (2006.01)
*G06F 15/16* (2006.01)
(52) U.S. Cl. ...................................... 358/1.15; 709/203
(58) Field of Classification Search ................. 358/1.15; 715/205, 255
See application file for complete search history.

(56) References Cited

U.S. PATENT DOCUMENTS

| 6,029,182 A * | 2/2000 | Nehab et al. .................. 715/205 |
| 2003/0074448 A1* | 4/2003 | Kinebuchi et al. ............ 709/225 |
| 2003/0208472 A1* | 11/2003 | Pham .............................. 707/2 |
| 2004/0064200 A1* | 4/2004 | Kondo et al. ................... 700/19 |
| 2007/0139698 A1* | 6/2007 | Sato ............................. 358/1.15 |

FOREIGN PATENT DOCUMENTS

JP         11-265273         9/1999

* cited by examiner

*Primary Examiner* — Saeid Ebrahimi Dehkordy
(74) *Attorney, Agent, or Firm* — Banner & Witcoff, Ltd.

(57) ABSTRACT

A print control apparatus is provided. The print control apparatus includes: a storage unit which stores web page information which is received, in response to search key information transmitted to a server of a search engine, from the server; and a print controller which controls printing of web page information. The storage unit further stores transition information indicating a transition state from the web page information received in response to the search key information transmitted to the server to the web page information to be printed. The print controller includes: a first extracting unit which extracts search key information from the transition information; and a combining unit which combines the web page information to be printed and the extracted search key information.

15 Claims, 11 Drawing Sheets

PRINT CONTROL APPARATUS AND PROGRAM

CROSS-REFERENCE TO RELATED APPLICATION

This application claims priority from Japanese Patent Application Nos. 2008-075164, filed on Mar. 24, 2008 and 2009-017698, filed on Jan. 29, 2009, the entire subject matter of which is incorporated herein by reference.

TECHNICAL FIELD

Aspects of the present invention relate to a print control apparatus and a program, and more particularly, to a print control apparatus and a program capable of additionally printing search information used to access a web page to be printed.

BACKGROUND

In recent years, when printing a web page displayed on a personal computer (PC) through the Internet, there has been used a function of adding a print date or a URL of the web page as additional information to, for example, a header. JP-A-11-265273 describes a technique of extracting a URL included as a link source in the printed web page together with a linked character string and prints them, thereby printing link source information of the printed web page as well as the web page.

SUMMARY

In JP-A-11-265273, although it is possible to add information of a linked page to the printed web page, it is not considered to add information indicating how to access the printed web page, to the printed web page. For example, when a user prints a web page including information that the user wants to search in order to store the web page, the user needs to separately print a web page used for a search in order to know which search keyword is used to access the web page. In addition, in order to access the web page later, the user needs to input the URL added to the header, or the user needs to remember the keyword used for the search and perform a search again using the keyword, which is inconvenient.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a print control apparatus and a program capable of simultaneously printing web page information to be printed and search information.

According to an exemplary embodiment of the present invention, there is provided a print control apparatus comprising: a storage unit which stores web page information which is received, in response to search key information transmitted to a server of a search engine, from the server; and a print controller which controls printing of web page information. The storage unit further stores transition information indicating a transition state from the web page information received in response to the search key information transmitted to the server to the web page information to be printed. The print controller comprises: a first extracting unit which extracts search key information from the transition information; and a combining unit which combines the web page information to be printed and the extracted search key information.

According to another exemplary embodiment of the present invention, there is provided a computer-readable medium having a computer program stored thereon and readable by a computer which controls printing of web page information obtained though transition from a search result received from a server of a search engine in response to a search key information transmitted to the server, and which stores transition information indicating a transition state from the search result to the web page information to be printed, the computer program, when executed by the computer, causing the computer to perform operations comprising: extracting the search key information from the transition information; and combining the extracted search key information with the web page information to be printed.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Exemplary Embodiment

Configuration of Printing System

Figure 1:
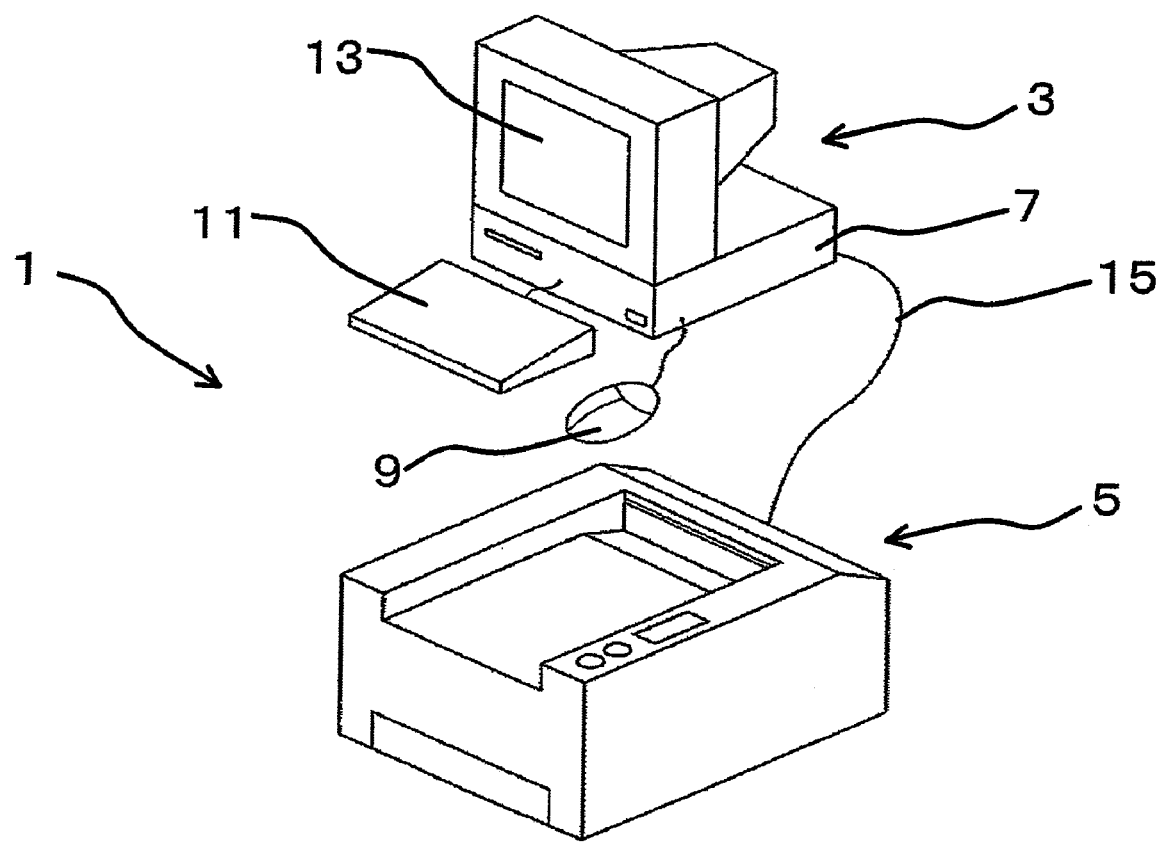
FIG. 1 is an outer appearance diagram illustrating a personal computer and a printer connected to the personal computer.

Hereinafter, a printing system 1 including a print control apparatus according to an exemplary embodiment of the present invention will be described in detail with reference to the accompanying drawings. FIG. 1 is an outer appearance diagram illustrating a personal computer (PC) 3 and a printer 5 connected to the PC 3, which configure the printing system 1.

The PC 3 includes a main body 7, a mouse 9 and a keyboard 11, which are user input units, and a display 13, such as a CRT.

The mouse 9, the keyboard 11, and the display 13 are connected to the main body 7. The PC 3 can perform various information processing operations, such as image processing. For example, the PC has a browser function of displaying data (content) described in an HTML language that is provided by a WWW server on the Internet.

The printer 5 is connected to the main body 7 of the PC 3 by a cable 15 as a connection means. The connection means for connecting the printer 5 and the PC 3 is not limited to the cable. The printer 5 and the PC 3 may be connected to each other by a network, such as a LAN, or a wireless communication system, such as an infrared communication system. The printer 5 may be a laser printer, an ink jet printer, a color printer, or a monochrome printer.

[Electrical Configuration of Printing System]

Figure 2:
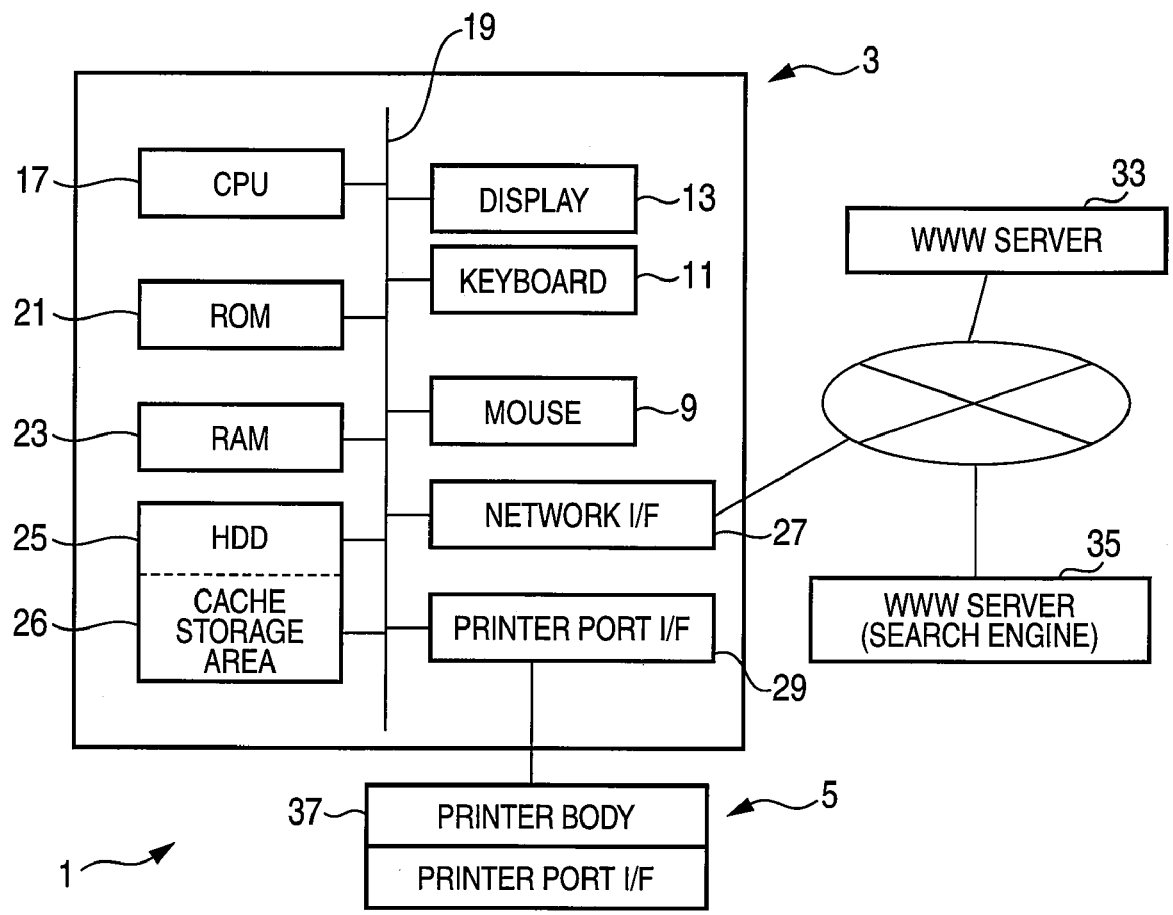
FIG. 2 is a block diagram illustrating a hardware configuration of a printing system.

Next, the hardware configuration of the printing system 1 will be described. FIG. 2 is a block diagram illustrating the hardware configuration of the printing system 1.

The PC 3 includes a CPU 17 that performs various operations. The following components are connected to the CPU 17 via a bus 19: a ROM 21 that stores programs executed by the CPU 17, such as a BIOS; a RAM 23 that temporarily stores data; a hard disk drive (HDD) 25 that is a data storage device; a network interface (network I/F) 27; a printer port interface (printer port I/F) 29; the display 13; the keyboard 11; and the mouse 9. In addition, the PC 3 is connected to WWW servers 33 to 35 through the network I/F 27 and the Internet 31, which is a wide area network.

The CPU 17 controls the operation of the PC 3, the display 13, the keyboard 11, and the mouse 9.

The HDD 25 stores various programs, such as a printer driver program for controlling the printer 5 to perform printing, a browser program for executing a browser function, and an operating system (OS) executed by the CPU 17 to control the operation of the PC 3. Application programs, such as the printer driver program and the browser program, may be downloaded from the Internet and then stored. Alternatively, the application programs may be installed from a storage medium, such as a CD-ROM, and then stored. In addition, the HDD 25 includes a cache storage area 26 that stores a cache at a web page display operation, which will be described below.

The cache is a file including information on the content of a web page, a transition state in an access process to the web page and information on the web page. The information is stored in the file on content by content basis in a text format. Specifically, the information on a transition state includes a URL of a web page and a URL of a source web page from which the web page is linked.

The RAM 23 stores, for example, temporary data while a program is executed, data required to operate the printer driver, and print data used to print an image.

The printer 5 includes a printer body 37 and the printer port I/F 29. The PC 3 and the printer 5 are connected to each other via the printer port I/F 29, such as a USB. Alternatively, the PC 3 and the printer 5 may be connected to each other via a network, such as a LAN I/F or a wireless LAN.

Although not shown in the drawings, the printer 5 also includes a CPU that controls the operation of the printer 5, a ROM that stores various control programs executed by the CPU, and a RAM that temporarily stores data, which are connected to one another by a bus. Print data transmitted from the PC 3 is transmitted to the printer through the printer port I/F 29. The CPU of the printer 5 performs a printing process on the basis of the received print data.

The WWW servers 33 and 35 provide various content as web pages to a request source apparatus. A hyper text transfer protocol (HTTP), which is a protocol for transmitting and receiving content, is defined between a browser and the WWW servers. The WWW servers 33 and 35 provide web pages indicating the content stored in their own databases, respectively, to the request source apparatus in response to a request from an external device, such as the PC 3, according to the protocol. The search engine 35 is one of the WWW servers. The search engine 35 has a function of searching information related to at least one keyword that is input through the Internet and is represented by text data.

[Display of Web Page by Search Engine]

Next, an operation of using the search engine 35 to display a user's desired web page on the display 13 of the PC 3 will be described. Hereinafter, the web page provided by the search engine 35 is referred to as a search site.

Figure 3:
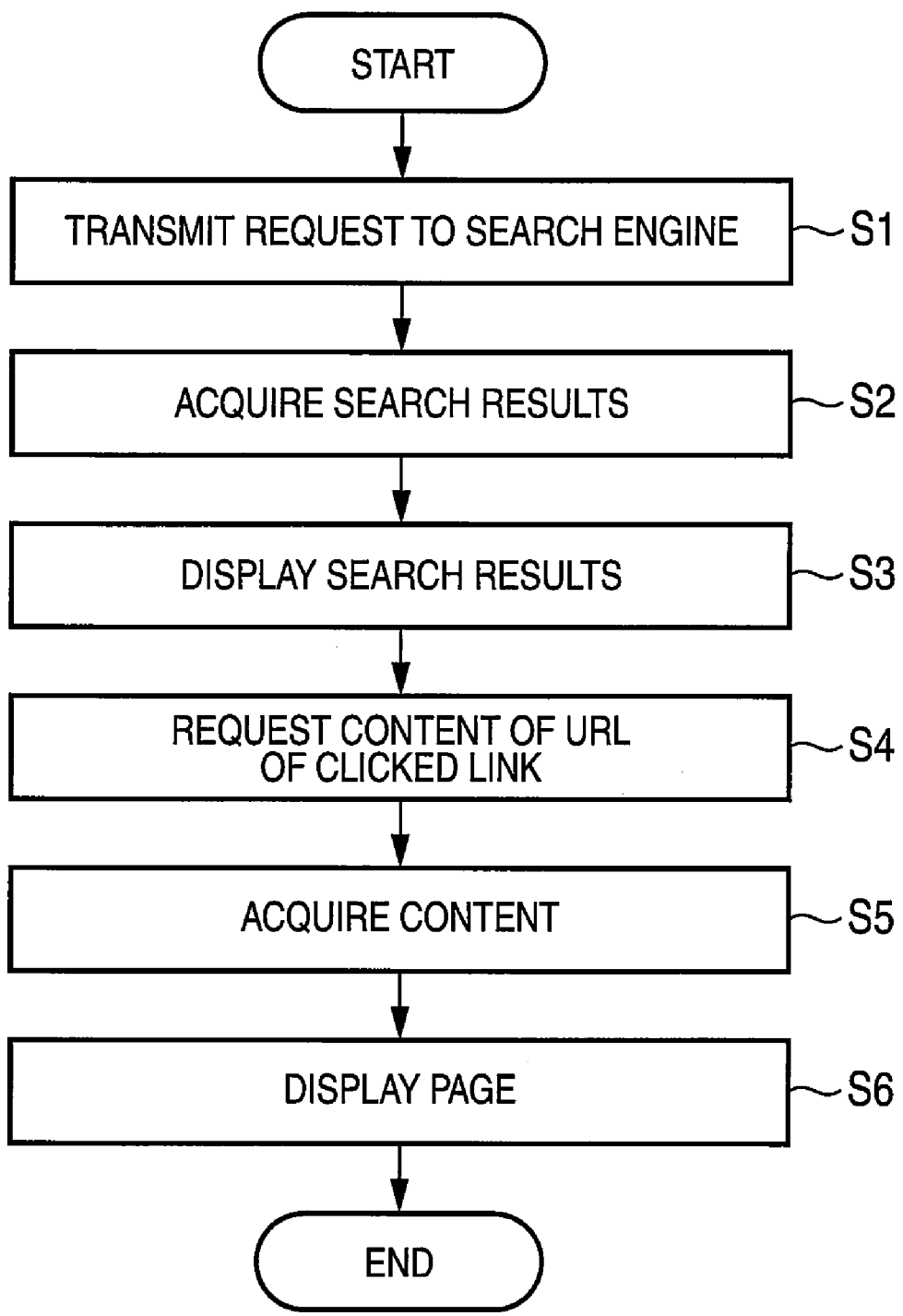
FIG. 3 is a flowchart illustrating a process of searching a web page using a search site.
Figure 4:
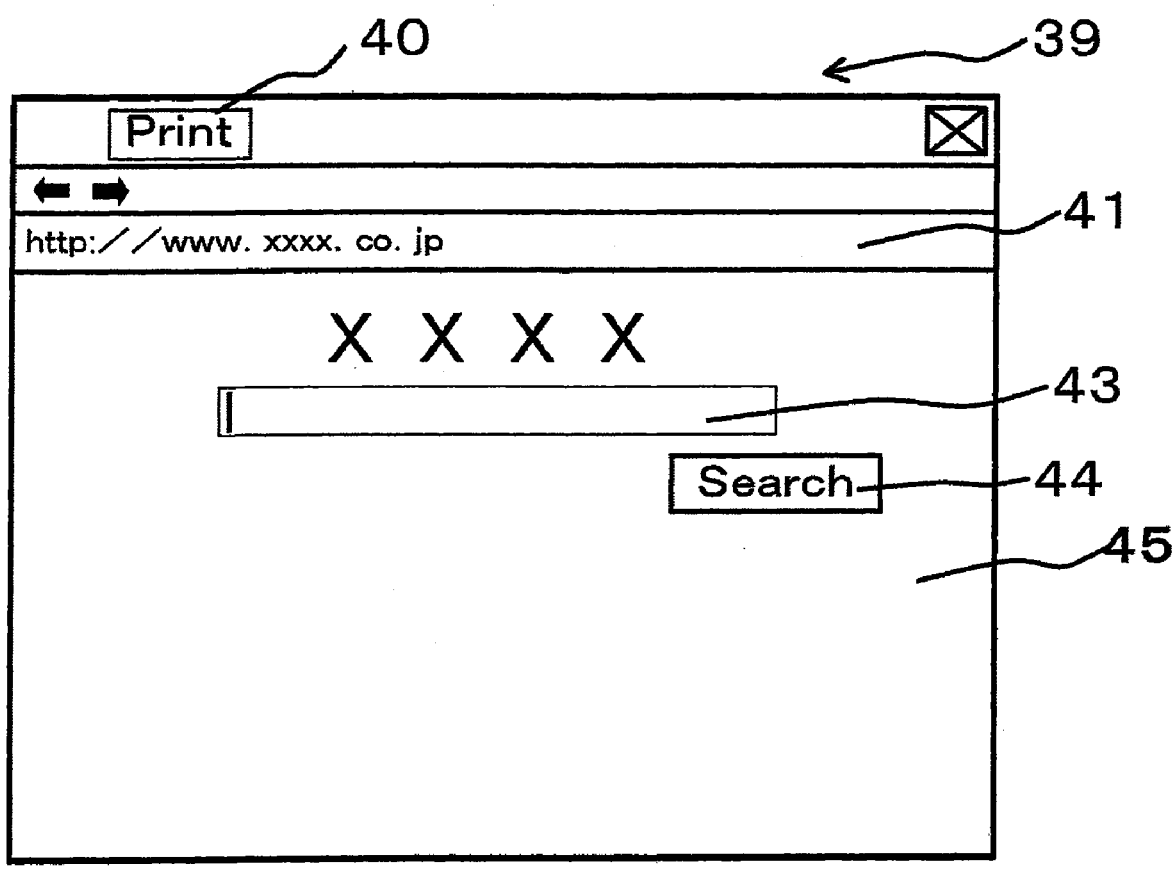
FIG. 4 is a diagram illustrating an example in which a URL is input to a browser screen displayed on a display to access a search site.

FIG. 3 is a flowchart illustrating the operation of the CPU 17 using the search site to search a web page. FIG. 4 is a diagram illustrating an example state of a START in FIG. 3, in which the CPU 17 starts up a browser program and a URL (for example, in the form of http://www.xxxx.co.jp) corresponding to the address of the search engine 35 on the Internet is input to a browser screen displayed on the display 13 to access (change, transition) the search site. A browser screen 39 includes a URL input portion 41 to which the URL of a web page is input and a print button 40. In order to access the search engine 35, a user can use an input unit, such as the keyboard 11, to directly input the URL, thereby designating the URL. In addition, the user may use the mouse to select an item corresponding to the search site stored in a so-called 'My Favorites' or 'Bookmark', which is one of the functions of the browser program, to designate the URL.

When the URL is input to the browser screen 39, the PC 3 requests the search engine 35 having the input URL to transmit content described by the HTML language through the Internet. The search engine 35 transmits content, which is data for the requested web page, to the PC 3. When receiving the content, the PC 3 stores the content in the RAM 23, analyzes the content using the browser program, and displays the search site on the display 13, as shown in FIG. 4.

A web page display portion 45 of the search site provided by a search engine provider may have various designs. However, generally, the web page display portion has the following configuration. A keyword input portion 43 to which a keyword that the user wants to search on the Internet can be input and a search button 44 for starting search on the basis of the input keyword are displayed on the web page display portion 45 of the search site.

Next, an operation of searching a web page in a search site will be described with reference to FIG. 3. In Step S1, when the user inputs a search keyword and clicks the search button 44, the keyword is transmitted to the search engine 35. The search engine 35 transmits content indicating a list of web pages including the keyword transmitted from the search engine 35 among the web pages existing in the WWW server 33 as a search result to the PC 3. The HTTP is defined to add various information items called header information in the communication of data, and is stored as a cache in the cache storage area 26 of the HDD 25 together with content.

In Step S2, the PC 3 acquires the search result from the search engine 35, and stores the search result in the RAM 23. In Step S3, the PC 3 displays the search result on the display 13. The search result is displayed such that the user can access URLs indicating web pages corresponding to the search result. Therefore, the user uses the mouse 9 to request the content of the URL (S4), and the WWW server 33 transmits content corresponding to data of the requested web page to the PC 3. In Step S5, when receiving the content, the PC 3 stores the content in the RAM 23. In Step S6, the PC 3 reads the content and displays the web page on the display 13. In this way, the user can access a desired web page with reference to the search result obtained by the search engine 35 on the Internet.

Figure 5:
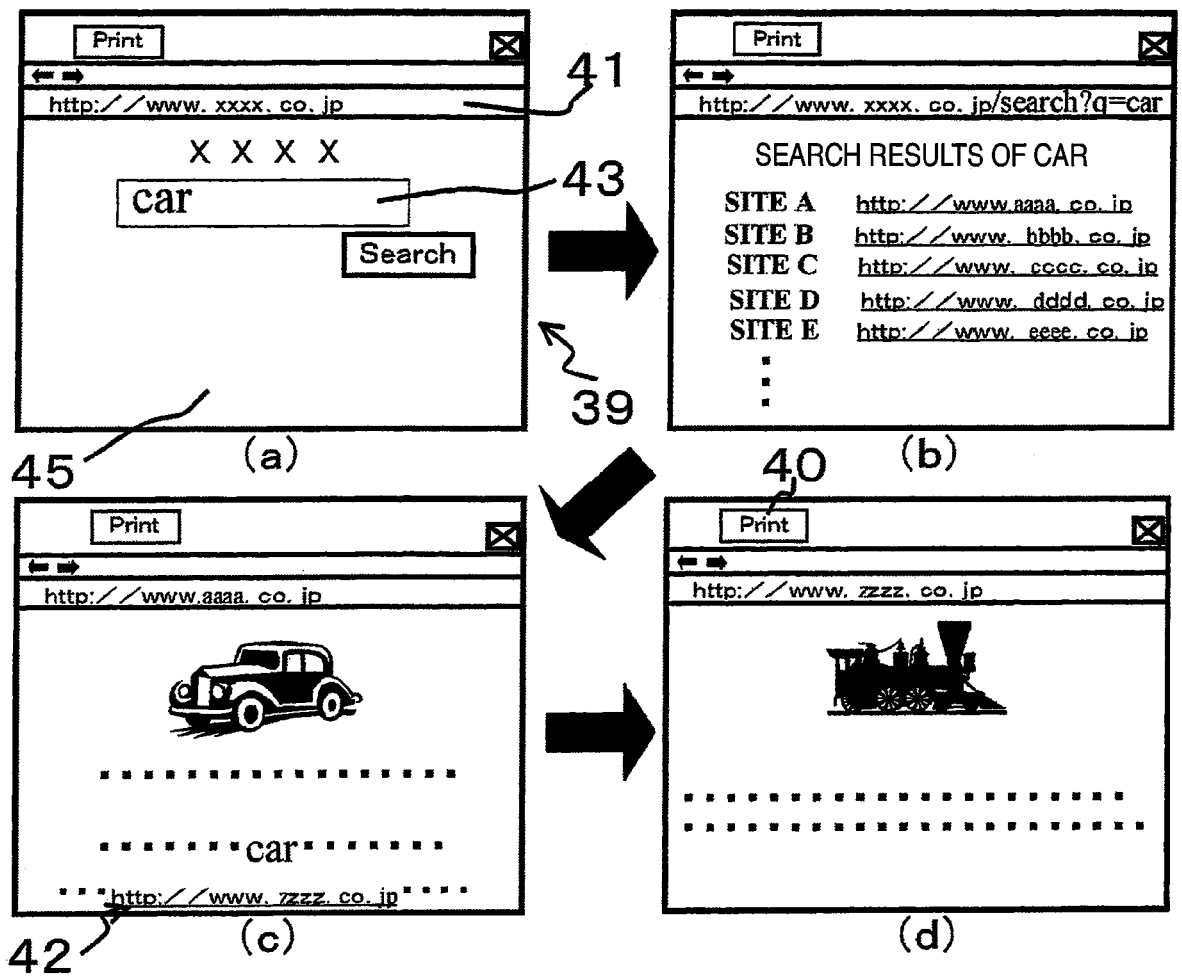
FIG. 5 is an image diagram illustrating transition in the display state of a web page display portion on the browser screen when the web page accessed by a user is changed.

FIG. 5 is an image diagram illustrating transition in the display state of the web page display portion 45 on the browser screen 39 when the web page accessed by the user is changed. In (a) of FIG. 5, the user inputs a search keyword to the search site. In this exemplary embodiment, the user inputs a keyword 'car'. Then, in (b) of FIG. 5, the search result transmitted from the search engine 35 on the basis of the input keyword is displayed. Here, the titles of the searched web pages (SITE A, SITE B, . . . ) and the URLs of the web pages are displayed as links.

In (c) of FIG. 5, the user accesses a desired web page (SITE A) on the basis of the search result shown in (b) of FIG. 5, and the desired web page is displayed. In (d) of FIG. 5, another web page (SITE Z) is shown when the user clicks a link in the content of the 'SITE A'. As such, by clicking a link portion 42 displayed on the web page, the user can request the content of a web page corresponding to the linked URL from the WWW server, and access another web page from the current web page. When the web page is changed to another web page, the URL displayed on the URL input portion 41 of the browser screen 39 is updated, and the user knows that the web page has been changed.

Further, each time the web page is changed, the cache of the web page is stored in the cache storage area 26 of the HDD 25.

[Printing of Web Page with Keyword]

Figure 6:
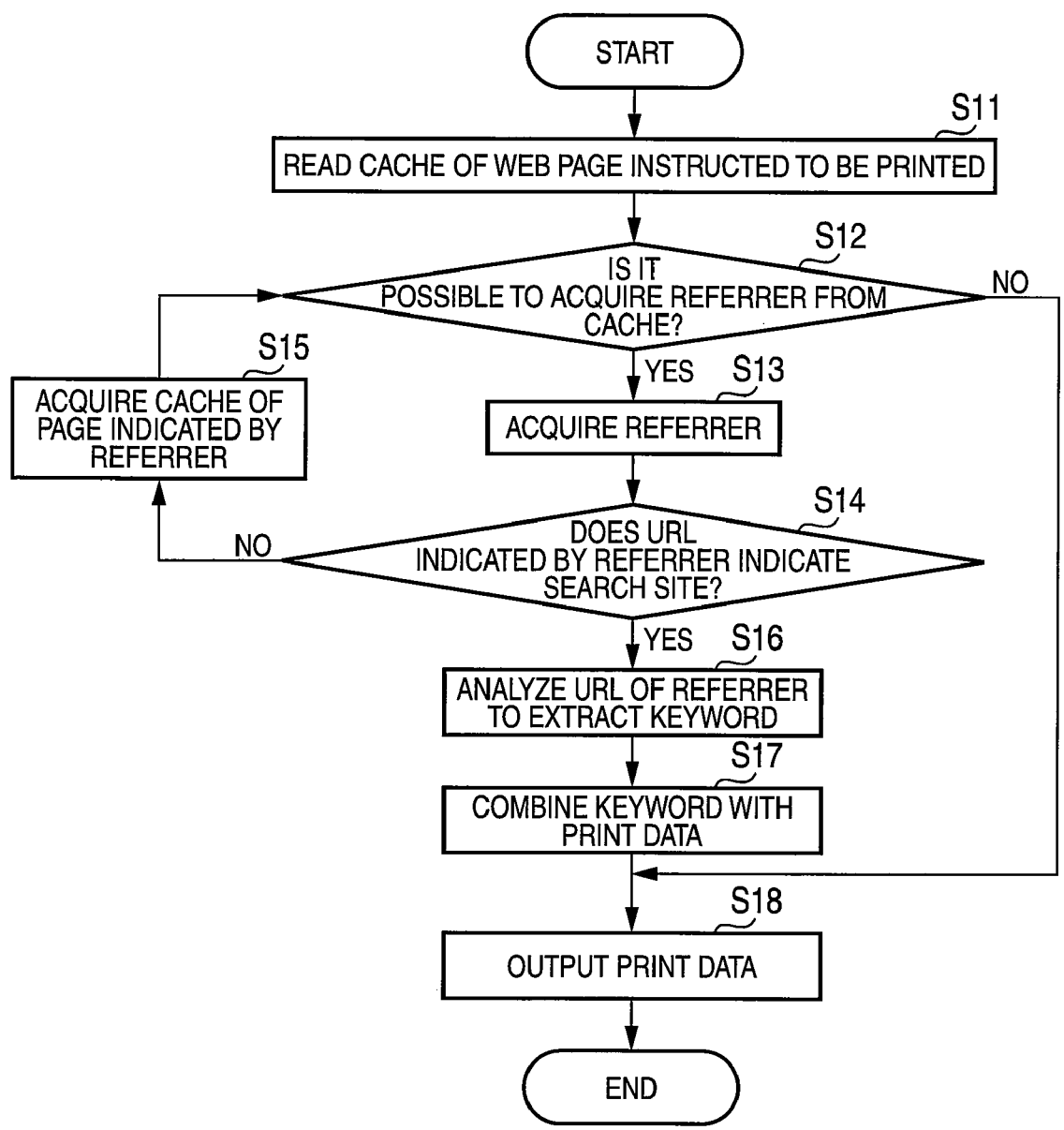
FIG. 6 is a flowchart illustrating a process of a printer driver program when a web page is printed.

Next, the operation of the CPU 17 to print a web page together with a keyword used to search the web page will be described in detail with reference to a flowchart. FIG. 6 is a flowchart illustrating the operation of the printer driver program when a web page is printed.

At first, a START state in FIG. 6 will be described. In this exemplary embodiment, it is assumed that the search site described with reference to FIG. 3 is used to search a web page, the user accesses a desired web page on the basis of the search result, and the desired web page is displayed. The display state of the browser corresponds to (c) of FIG. 5.

When the user clicks the print button 40 for print setting to start a printer driver, the printer driver program stored in the HDD 25 starts up, and an execution portion of the program is stored in the RAM 23 and executed. When the printer driver starts up, a print setting screen is displayed on the display 13. The print setting screen includes a check box that enables the user to select whether to print the print result together with a keyword. The user can set, for example, the number of prints and the printing of the keyword. When the print setting operation ends, a print instruction is issued via the print setting screen. In the START state, it is assumed that a print instruction to print the displayed web page together with the keyword is issued.

In Step S11, the cache of the web page on which print setting is instructed is read (obtained) and then stored in the RAM 23. Specifically, since the cache is stored in the cache storage area 26 of the PC 3, the CPU 17 can store a cache corresponding to the web page that is currently displayed on the display 13 in the RAM 23.

Specifically, at first, it is identified a browser program which is executed currently. A location (folder) in the cache storage area 26, in which cache is stored is determined according to a browser program, and therefore, once the current browser is identified, the location in which the cache is stored can be acquired.

Then, a character string of a URL of the web page to be printed is searched from among a plurality of caches stored in the text format. Herein, 'http://www.xxxx.co.jp' corresponds to the URL of the web page to be printed. The cache having the URL of the web page to be printed is read to the RAM 23.

In Step S12, it is determined whether it is possible to acquire a referrer from the cache obtained in Step S11. The referrer is information included in header information, which is one of the information items of the cache. When the user clicks a link on one web page to access another web page, the referrer indicates the URL of the link source web page.

As the specific manner for acquiring a referrer from a cache, a position of the text format cache, to which information corresponding to the referrer is stored in the cache, is set in advance. For example, the number of line from the above in the cache file is set in advance. Then, it is determined whether a URL is stored in the set position.

If it is determined that the referrer can be acquired from the cache, in other words, the referrer is included in the header information (S12: YES), the process proceeds to Step S13 to read the referrer. When the link source web page does not transmit the referrer for the reason of security and it is not possible to acquire the referrer from the header information, or when the web page is directly designated from the bookmark of the browser or from the URL input portion 41 (S12: NO), the process proceeds to Step S18 to generate print data from the content of the web page and transmit it to the printer 5.

In Step S13, specifically, when a cache is acquired for the state shown in (c) of FIG. 5, the header information of the 'SITE A' includes the referrer of the web page shown in (b) of FIG. 5. In this case, the referrer is 'http://www.xxxx.co.jp/search?q=car' displayed in the URL display portion 41 in (b) of FIG. 5.

Then, the process proceeds to Step S14 to determine whether the URL indicated by the read referrer is the web page indicating the search result of the search site. Specifically, the URLs of the search sites are registered in a storage unit, such as the HDD 25, and it is determined whether the character string of the registered URL is included in the character string of the URL in the referrer. In this exemplary embodiment, it is assumed that a character string 'http:/www.xxxx.co.jp' is registered as the domain name of the search site in the HDD 25. In this case, it is determined that the web page shown in (b) of FIG. 5 is the search site (S14: YES), and the process proceeds to Step S16. If the registered character string does not exist in the referrer (S14: NO), it is determined that the web page is not the search site, and the process proceeds to Step S15.

In Step S15, the cache of the web page indicated by the referrer is acquired and stored in the RAM 23. For example, when the web page is instructed to be printed in the state shown in (d) of FIG. 5, the process proceeds to Step S15. In this case, the character string of the URL for the 'SITE A' is included in the referrer that is referred to in Step S14, and the link source web page is found to be not the search site. Thereafter, the cache of the 'SITE A' is acquired, and it is determined in Step S12 whether it is possible to acquire the referrer again. If it is determined that it is possible to acquire the referrer, it is determined in Step S14 whether the web site indicated by the referrer corresponds to the search site.

As such, it is possible to access the URL of the search site on the basis of transition in the search process by repeatedly performing Steps S12 to S15. After the referrer indicating the web page of the search result of the search site is acquired, the process proceeds to Step S16. Accordingly, even if the web page to be printed is obtained through a plurality of web pages from a web page from which the web page of the search result is linked, the web site corresponding to the search site can be found.

In Step S16, the URL of the referrer is analyzed to acquire the keyword used for search, and the keyword is stored in the RAM 23. When the URL indicated by the referrer corresponds to the web page indicating the search result of the search site, it is possible to extract the keyword from the character string of the URL. The URL indicating the search result provided by the search engine 35 is generated by arranging a keyword or other additional information in a specific format after the URL of the search site. For example, in the URL displayed in the URL input portion 41 shown in (b) of FIG. 5, a character string 'search?q=car' is arranged after 'http://www.xxxx.co.jp'. In this case, a character string after 'search?q=' indicates the keyword input to the search site. That is, the keyword is extracted while utilizing the URL of the search site.

Then, if information indicating that the character string after 'search?q=' is a keyword in a search site 'xxxx' is registered in the HDD 25, the URL can be analyzed according to the registered format to extract a keyword 'car'. As such, it is possible to extract a keyword from the URL indicated by a referrer by registering a search engine and a keyword description format used in the search engine in a storage unit, such as the HDD 25.

The keyword description format used to extract a keyword may be acquired from a database of the search engine 35 through the network I/F 27. When the keyword description format is acquired from the database, it is possible to analyze a URL from a new keyword description format all the time.

When the character string of a keyword includes non-ASCII characters indicating a 'car' in Chinese characters, not ASCII characters, the character string is described in the URL as codes, which are encoded by a predetermined encoding scheme. In this case, it is possible to extract the original character string by decoding the encoded character string.

Then, the process proceeds to Step S17 to combine the extracted keyword with print data. In the START state, when the user inputs a print instruction, the CPU 17 has generated print data from the content of the web page. The print data includes image data of the web page and information on the arrangement of the web page. Information of the keyword is combined with the print data together with the keyword in the image data of the web page, and incorporated in the print data.

Figure 7:
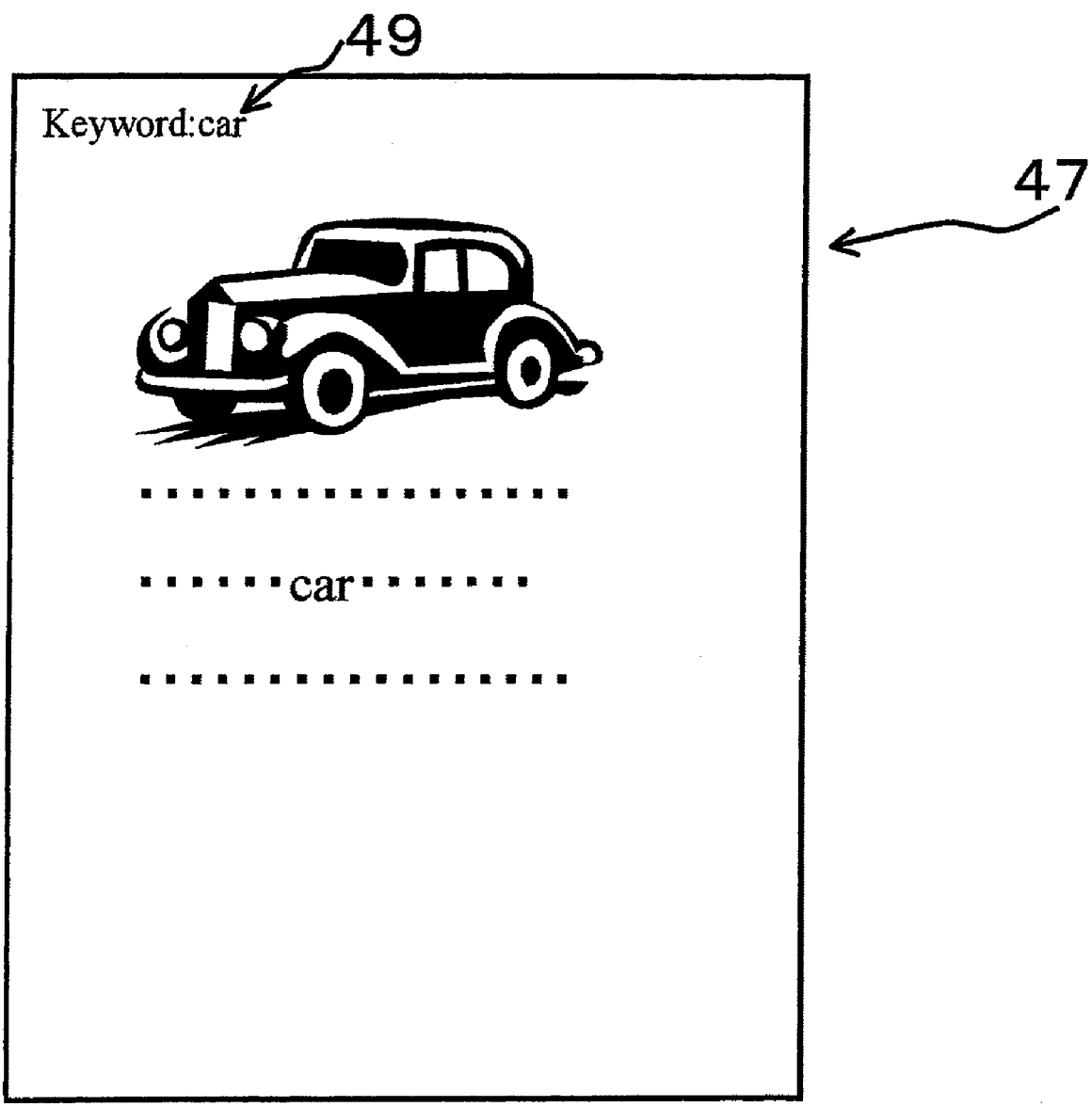
FIG. 7 is a diagram illustrating a printing medium on which a web page shown in (c) of FIG. 5 is printed.

Then, the process proceeds to Step S18 to transmit the generated print data to the printer 5. The printer 5 performs printing on the basis of the print data to print an image on a printing medium, such as a sheet. FIG. 7 is a diagram illustrating a printing medium 47 on which the web page shown in (c) of FIG. 5 is printed. In FIG. 7, the web page is printed on the printing medium and a keyword 49 input to the search site is also printed on the printing medium in the upper left portion thereof.

As described above, in this exemplary embodiment, a keyword is extracted with reference to the referrer included in a cache corresponding to the web page to be printed, and the keyword is incorporated into print data. Therefore, it is possible to print the web page having the keyword combined therewith on a printing medium. Accordingly, the user can know the search condition (keyword) from the printed web page.

Second Exemplary Embodiment

Change of Keyword Format

In a second exemplary embodiment, the process of the CPU 17 to change the format of a portion of the character string that is identical to the keyword in the web page to be printed will be described in detail with reference to a flowchart. In this exemplary embodiment, a method of searching and displaying a web page is similar to that in the first exemplary embodiment, and a description thereof will be omitted. In addition, the same components as those in the first exemplary embodiment are denoted by the same reference numerals.

Figure 8:
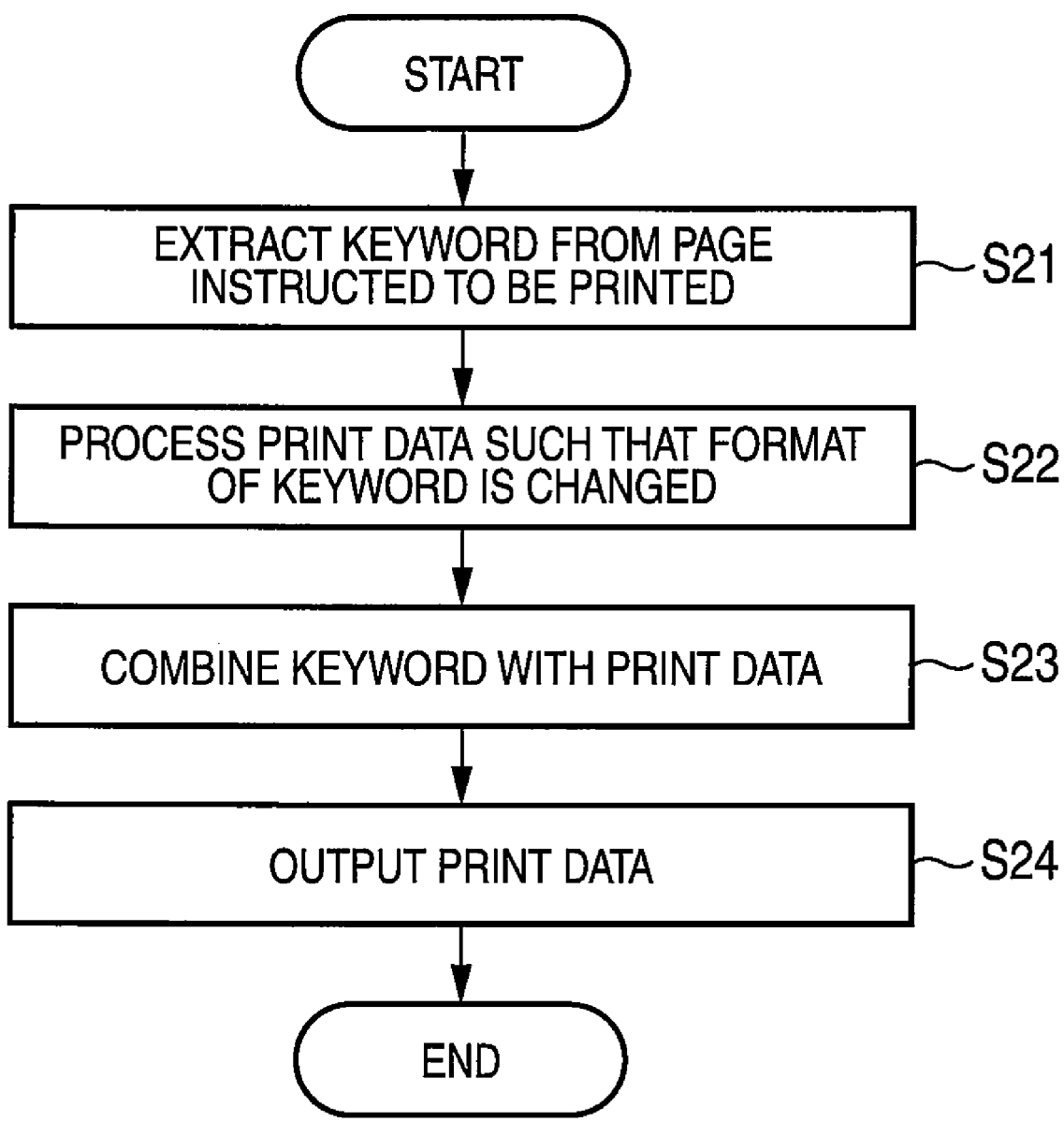
FIG. 8 is a flowchart illustrating a process of a CPU to change a keyword format.

FIG. 8 is a flowchart illustrating the process of the CPU 17 to change the keyword format. In a START state in FIG. 8, Step S16 shown in FIG. 6 ends, and the keyword is stored in the RAM 23.

In Step S21, a character string that is identical to the keyword in the web page instructed to be printed is extracted. Specifically, a character string that is identical to the keyword is extracted from the content of the web page stored in the RAM 23. Then, in Step S22, the print data is processed such that the format of the character string that is identical to the keyword in the print result is changed. Specifically, in Step S21, since a portion of the character string that is identical to the keyword in the web page to be printed is extracted, the print data is edited such that the size or the color of the font of a portion of the print result that is identical to the keyword is changed.

Then, in Step S23, similar to the first exemplary embodiment, the keyword is combined with the print data. In Step S24, the generated data is transmitted to the printer 5, and the printer performs printing on the basis of the received data.

Figure 9:
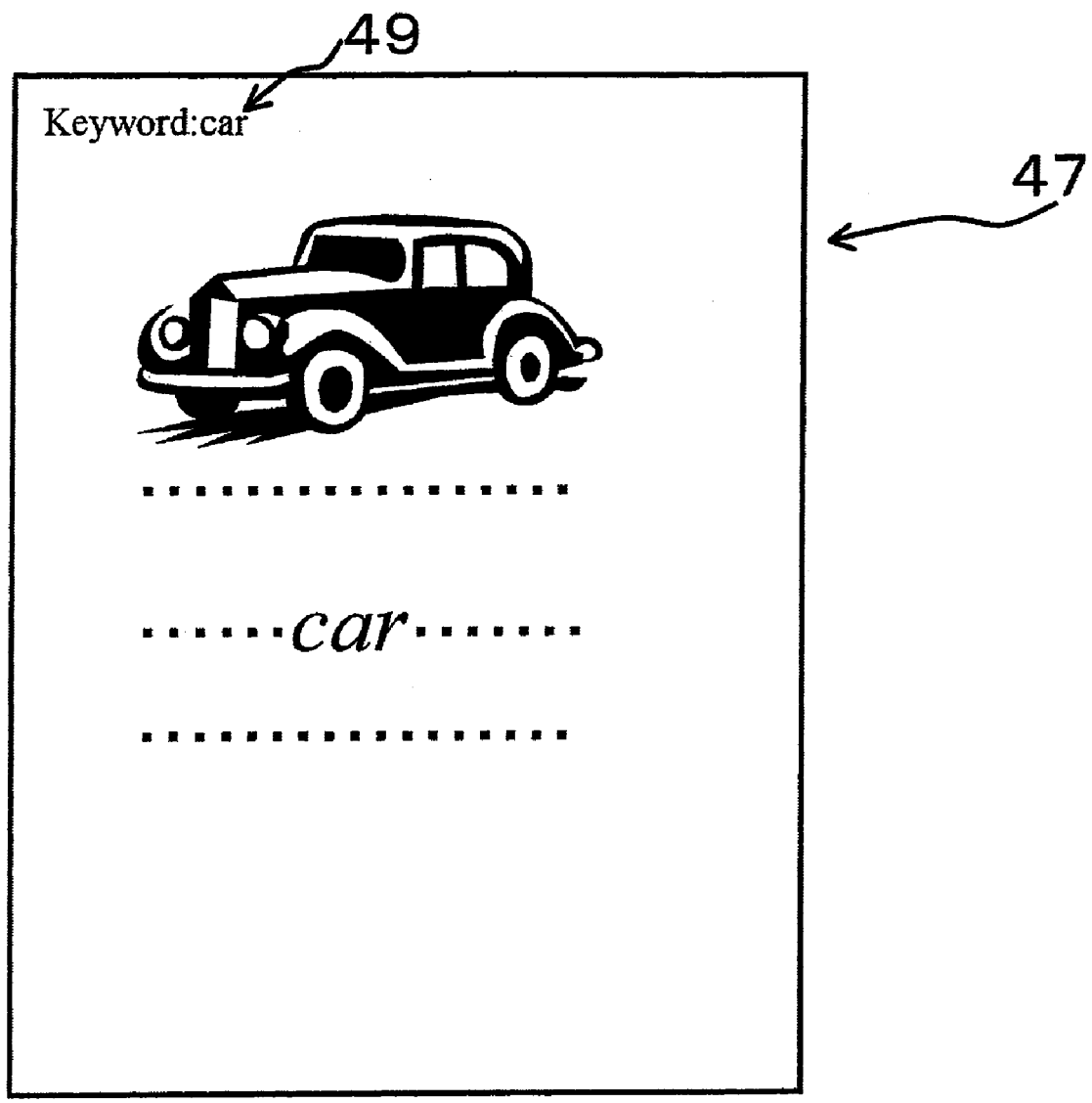
FIG. 9 is a diagram illustrating a printing medium on which the web page shown in (c) of FIG. 5 is printed with the format of a keyword being changed.

FIG. 9 is a diagram illustrating a printing medium 47 on which the web page shown in (c) of FIG. 5 is printed. In FIG. 9, the size of the font of a character string 'car' included in the print result of the web page printed on the printing medium 47 is enlarged and changed to an italic type. The format of the portion of the character string that is identical to the keyword in the web page to be printed can be changed such that the user can easily check the position of the keyword in the web page. Therefore, it is possible to improve the utility of the print result. The format of the character string is not limited to that according to this exemplary embodiment, but any format can be used as long as the user can easily recognize the character string.

Third Exemplary Embodiment

Extraction of Related Keyword

In a third exemplary embodiment, a process of extracting and printing a related keyword provided by a search site in addition to the keyword acquired in the first exemplary embodiment will be described with reference to a flowchart. Some of the search sites have a function of displaying, as a related keyword, a character string having similar meaning to a keyword, or the character string that was previously input by another user together with the keyword, when the search sites perform a search. For example, when a search is performed using a character string 'car', a character string 'car drive' is displayed as the related keyword. When the user uses the mouse to click the related keyword, a search is performed using the character string 'car drive' as a new keyword. In this exemplary embodiment, the related keyword as well as the keyword input by the user is extracted and printed.

Figure 10:
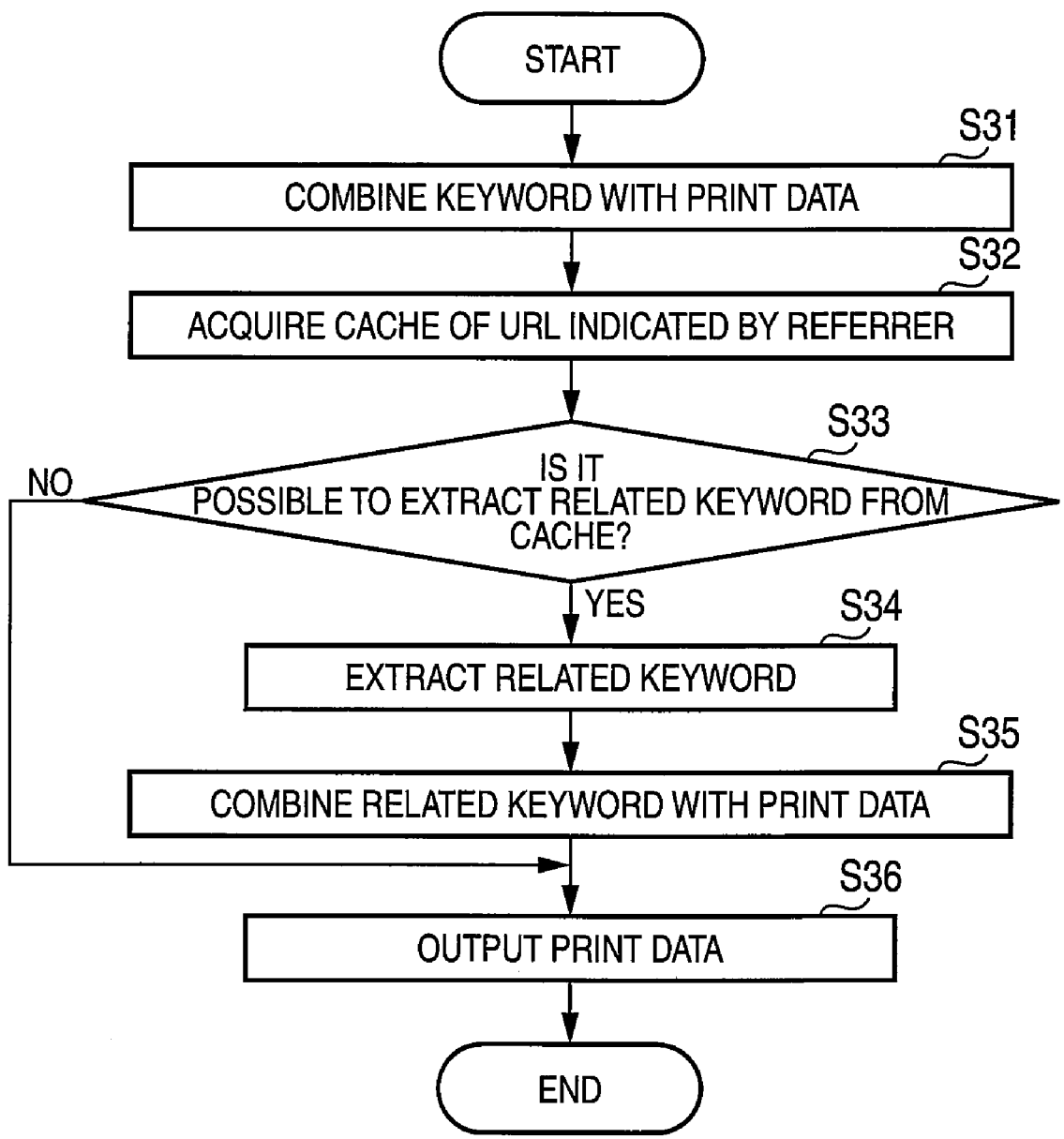
FIG. 10 is a flowchart illustrating a process of extracting and printing a related keyword provided by a search site in addition to a keyword.

FIG. 10 is a flowchart illustrating a process of extracting and printing the related keyword provided by a search site in addition to a keyword. In a START state in FIG. 10, Step S16 shown in FIG. 6 ends, the referrer of the web page indicating the search result is analyzed, and a keyword is stored in the RAM 23. In Step S31, the keyword stored in the RAM 23 is incorporated into print data. In Step S32, a cache is stored in the RAM 23 with reference to the URL indicated by the referrer.

Then, in Step S33, it is determined whether it is possible to extract a related keyword from the cache stored in the RAM 23. The content of the web page included in the cache are described in an HTML format, and images or link information to other web pages is described in a predetermined special format (tag). In order to search the related keyword from the content, a description format indicating which tag is used to describe the related keyword for each search site is stored in the HDD 25 in advance. Then, the description format of a corresponding search site is read and referred to find the related keyword from the content.

When information of the related keyword is not included in a cache corresponding to the web page indicating the search result or when it is impossible to extract the related keyword for the reason of security (S33: NO), the process proceeds to Step S36 to output the print data to the printer 5. In this case, the print result includes the keyword input to the search site by the user and the web page.

When the related keyword is included in the cache and it is possible to extract the related keyword (S33: YES), the process proceeds to Step S34 to extract the related keyword and store it in the RAM 23. Then, in Step S35, the related keyword is incorporated into the print data. In Step S36, the print data is output to the printer 5.

Figure 11:
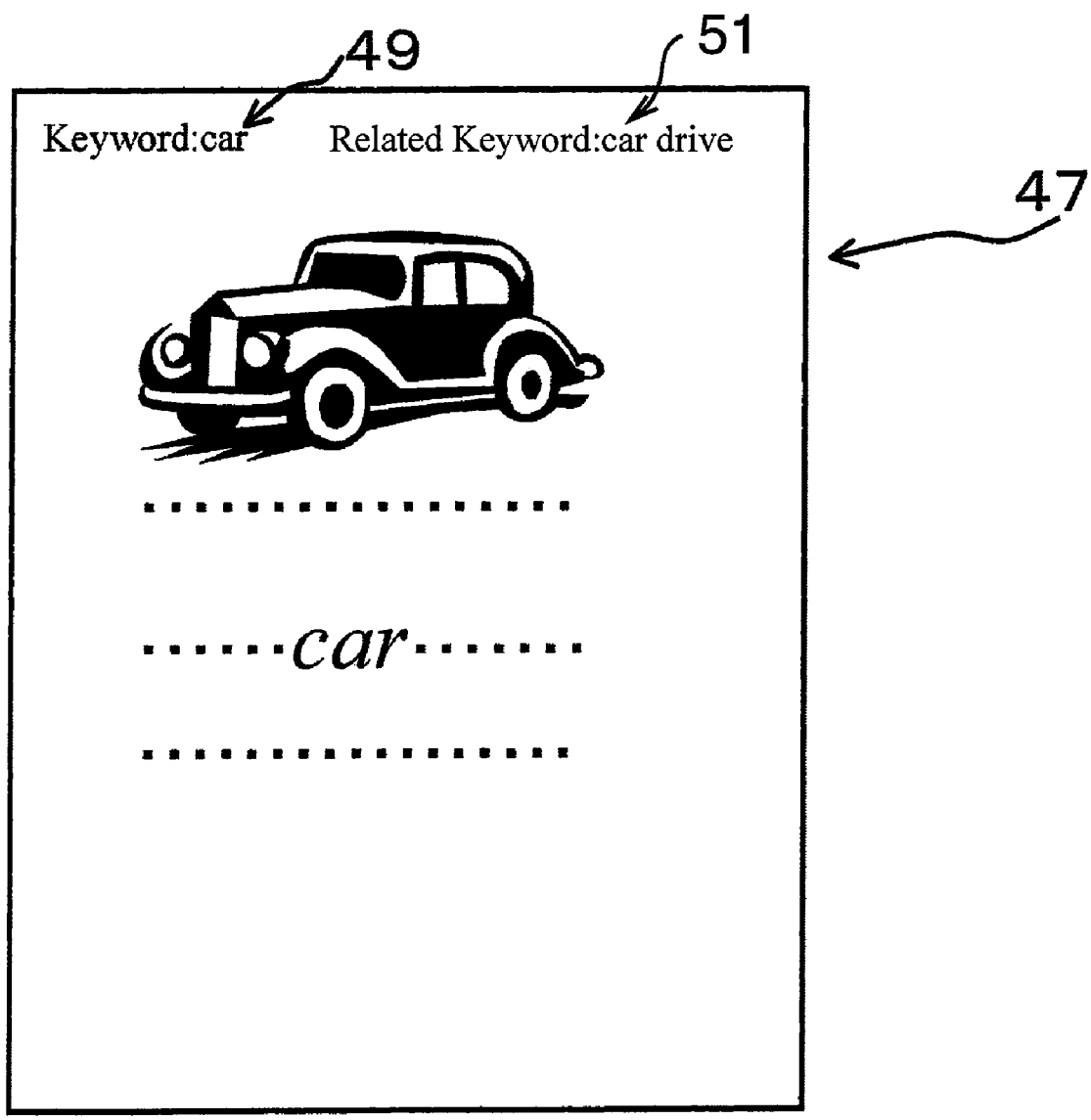
FIG. 11 is a diagram illustrating a printing medium on which a related keyword is printed.

FIG. 11 is a diagram illustrating a printing medium 47 on which the related keyword is printed. A character string 'car' and a character string 'car drive' are respectively printed as a keyword 49 and a related keyword 51 in an upper part of the printing medium 47. As such, since the keyword and the related keyword are printed on the printing medium, the user can recognize which keyword is used to perform a search. In addition, since the related keyword is printed, the user can perform a search in a wide range at the next search operation. As a result, it is possible to improve the utility of the printing medium having the web page printed thereon. Of course, the same process as that in the second exemplary embodiment may be performed on the related keyword.

In Step S34, the information of the search site as well as the related keyword may be extracted from the cache. For example, the site name of the search site may be extracted. Since the search result depends on the search engines, it is useful to know the search engine accessed by the user. The search key information may include information related to the search site in addition to the search keyword or the related keyword.

According to the above-described exemplary embodiment, while referring back to cache of the web page that the user wants to print, a URL of a server serving as a search site can be found. Then, from the URL, a keyword or a related keyword is extracted, and then combined with print data. Accordingly, it is possible to obtain a useful print result. For example, as in the first exemplary embodiment, the keyword input while the user accesses the web page that the user wants to print is extracted with reference to the referrer, and the extracted keyword is combined with the print data. Therefore, the keyword can be printed on the printing medium together with the web page. Accordingly, it is possible to improve user convenience and the utility of the printing medium having the web page printed thereon. As a result, it is possible to effectively utilize a URL, which is a link source. In addition, it is possible to extract a keyword even when web pages other than the web page directly linked to the search site are printed.

Further, the related keyword is extracted from the cache of a search site and then printed on a printing medium. Therefore, when the search site is used during the next search operation, it is possible to perform a search in a search range that is wider than that in the previous search operation. As a result, it is possible to improve the utility of a printing medium having a web page printed thereon.

Furthermore, a portion of the character string that is identical to a keyword in the web page to be printed is extracted, and the format of the extracted portion is changed. Therefore, it is possible to easily check the position of the keyword in the printed web page.

While the present invention has been shown and described with reference to certain exemplary embodiments thereof, it will be understood by those skilled in the art that various changes in form and details may be made therein without departing from the spirit and scope of the invention as defined by the appended claims.

For example, in the above-described exemplary embodiments, a search site is displayed, and a keyword is input to the keyword input portion 43 displayed in the web page display portion 45 to search a web page. However, a browser program that displays a browser screen having the keyword input portion incorporated into a tool bar may be used. In this case, a search keyword may be input to the keyword input portion incorporated into the tool bar without displaying a search site.

Furthermore, in the above-described exemplary embodiments, a cache is read from the cache storage area 26 of the HDD 25 to the RAM 23, and then a keyword is extracted. However, another method may be used to extract the keyword. For example, a function of the OS may be used to directly acquire the referrer from the HDD 25 without storing the cache in the RAM 23. In this case, similar to the above, it is possible to extract a keyword and combine the extracted keyword with print data.

What is claimed is:

1. A print control apparatus comprising:
a storage unit configured to store web page information which is received, in response to search key information transmitted to a server of a search engine, from the server; and
a print controller configured to control printing of web page information,
wherein the storage unit further stores transition information indicating a transition state from the web page information received in response to the search key information transmitted to the server to the web page information to be printed, and
wherein the print controller performs operations including:
extracting search key information from the transition information including a URL of the web page information to be printed and a URL of source web page information, from which the web page information to be printed is linked, the extracting operation including extracting the search key information from a URL corresponding to the server of the search engine;
combining the web page information to be printed and the extracted search key information;
determining whether the URL of the source web page information corresponds to the URL corresponding to the server of the search engine; and
wherein if the determining operation determines that the URL of the source web page information corresponds to the URL corresponding to the server of the search engine, the extracting step extracts the search key information from the URL of the source web page information.

2. The print control apparatus according to claim 1, wherein if the determining operation determines that the URL of the source web page information does not correspond to the URL corresponding to the server of the search engine, the extracting operation acquires web page information from which the source web page information is linked.

3. The print control apparatus according to claim 1, wherein the extracting operation extracts related key information, which is stored in a specific format, together with the search key information.

4. The print control apparatus according to claim 1, wherein the print controller further performs operations including:
    extracting a portion which matches the search key information from the web page information to be printed; and
    changing a format of the portion in the web page information to be printed.

5. The print control apparatus according to claim 1, wherein the extracting operation extracts a search keyword transmitted to the server of the search engine as the search key information.

6. The print control apparatus according to claim 1, wherein the extracting operation extracts information of a search site which the server of the search engine provides, as the search key information.

7. A non-transitory computer-readable storage medium having a computer program stored thereon and readable by a computer which controls printing of web page information obtained through transition from a search result received from a server of a search engine in response to a search key information transmitted to the server, and which stores transition information indicating a transition state from the search result to the web page information to be printed, the computer program, when executed by the computer, causing the computer to perform operations comprising:
    extracting the search key information from the transition information including a URL of the web page information to be printed and a URL of source web page information, from which the web page information to be printed is linked, the extracting operation including extracting the search key information from a URL corresponding to the server of the search engine;
    combining the extracted search key information with the web page information to be printed;
    determining whether the URL of the source web page information corresponds to the URL corresponding to the server of the search engine, and
    wherein if the determining operation determines that the URL of the source web page information corresponds to the URL corresponding to the server of the search engine, the extracting step extracts the search key information from the URL of the source web page information.

8. A print control apparatus comprising:
    a storage unit configured to store web page information which is received, in response to search key information transmitted to a server of a search engine, from the server; and
    a print controller configured to control printing of web page information,
    wherein the storage unit further stores transition information indicating a transition state from the web page information received in response to the search key information transmitted to the server to the web page information to be printed, and
    wherein the print controller performs operations including:
        first extracting search key information from the transition information; and
        combining the web page information to be printed and the extracted search key information;
        second extracting a portion which matches the search key information from the web page information to be printed; and
        changing a format of the portion in the web page information to be printed.

9. The print control apparatus according to claim 8, wherein the transition information includes a URL of the web page information to be printed and a URL of source web page information, from which the web page information to be printed is linked, and
wherein the first extracting operation extracts the search key information from a URL corresponding to the server of the search engine.

10. The print control apparatus according to claim 9, wherein the print controller further performs operations including determining whether the URL of the source web page information corresponds to the URL corresponding to the server of the search engine, and
wherein if the determining operation determines that the URL of the source web page information corresponds to the URL corresponding to the server of the search engine, the first extracting operation extracts the search key information from the URL of the source web page information.

11. The print control apparatus according to claim 8, wherein if the determining operation determines that the URL of the source web page information does not correspond to the URL corresponding to the server of the search engine, the first extracting operation acquires web page information from which the source web page information is linked.

12. The print control apparatus according to claim 8, wherein the first extracting operation extracts related key information, which is stored in a specific format, together with the search key information.

13. The print control apparatus according to claim 8, wherein the first extracting operation extracts a search keyword transmitted to the server of the search engine as the search key information.

14. The print control apparatus according to claim 8, wherein the first extracting operation extracts information of a search site which the server of the search engine provides, as the search key information.

15. A non-transitory computer-readable storage medium having a computer program stored thereon and readable by a computer which controls printing of web page information obtained through transition from a search result received from a server of a search engine in response to a search key information transmitted to the server, and which stores transition information indicating a transition state from the search result to the web page information to be printed, the computer program, when executed by the computer, causing the computer to perform operations comprising:
    extracting the search key information from the transition information;
    combining the extracted search key information with the web page information to be printed;
    extracting a portion which matches the search key information from the web page information to be printed; and
    changing a format of the portion in the web page information to be printed.

\* \* \* \* \*